United States Patent [19]
Sumi et al.

[11] Patent Number: 5,235,538
[45] Date of Patent: Aug. 10, 1993

[54] SEMICONDUCTOR OPERATION DEVICE WITH MEMORY FOR STORING OPERATION CODES CONNECTED FROM COEFFICIENTS PRIOR TO PERFORMING AN OPERATION ON AN INPUT SIGNAL

[75] Inventors: Norio Sumi, Kodaira; Hirotsugu Kojima, Nerima; Junko Nakase, Hachiouji, all of Japan

[73] Assignees: Hitachi, Ltd., Tokyo; Hitachi Device Engineering Co., Ltd., Chiba, both of Japan

[21] Appl. No.: 756,884

[22] Filed: Sep. 9, 1991

[30] Foreign Application Priority Data

Sep. 7, 1990 [JP] Japan .................. 2-235706

[51] Int. Cl.$^5$ .................................... G06F 7/52
[52] U.S. Cl. .................. 364/760; 364/724.16; 364/750.5
[58] Field of Search ............. 364/760, 748.5, 724.16, 364/750.5

[56] References Cited

U.S. PATENT DOCUMENTS

| | | | |
|---|---|---|---|
| 3,610,901 | 10/1971 | Lynch | 364/748.5 |
| 4,546,446 | 10/1985 | Machida | 364/760 |
| 4,769,780 | 9/1988 | Chang | 364/760 |
| 4,831,577 | 5/1989 | Wei et al. | 364/760 |
| 4,967,388 | 10/1990 | Tate | 364/760 |
| 5,038,315 | 8/1991 | Rao | 364/760 |
| 5,040,139 | 8/1991 | Tran | 364/760 |

FOREIGN PATENT DOCUMENTS 63-1258  6/1988  Japan .

Primary Examiner—David H. Malzahn
Attorney, Agent, or Firm—Antonelli, Terry, Stout & Kraus

[57] ABSTRACT

The present invention features performance of operation processing between a signal obtained by converting a coefficient into a Booth code with a Booth encoder, storing the Booth code in a memory device in advance and reading out the stored Booth code for processing an input signal in a semiconductor operation device or a digital filter. As a result, a coding operation by a Booth encoder of the present invention will be performed only once at the time of rewriting a coefficient and will not be repeated, thereby enabling a high-speed operation and realizing reduction of circuit scale at the same time by using an encoded Booth code directly in an operation after a coefficient has been determined.

10 Claims, 7 Drawing Sheets

SEMICONDUCTOR OPERATION DEVICE WITH MEMORY FOR STORING OPERATION CODES CONNECTED FROM COEFFICIENTS PRIOR TO PERFORMING AN OPERATION ON AN INPUT SIGNAL

BACKGROUND OF THE INVENTION

1. Field of the Invention

The present invention relates to a high-speed semiconductor operation device, and concerns a multiplication circuit suitable for increasing the speed of operation in particular.

2. Description of the Prior Art

Figure 2:
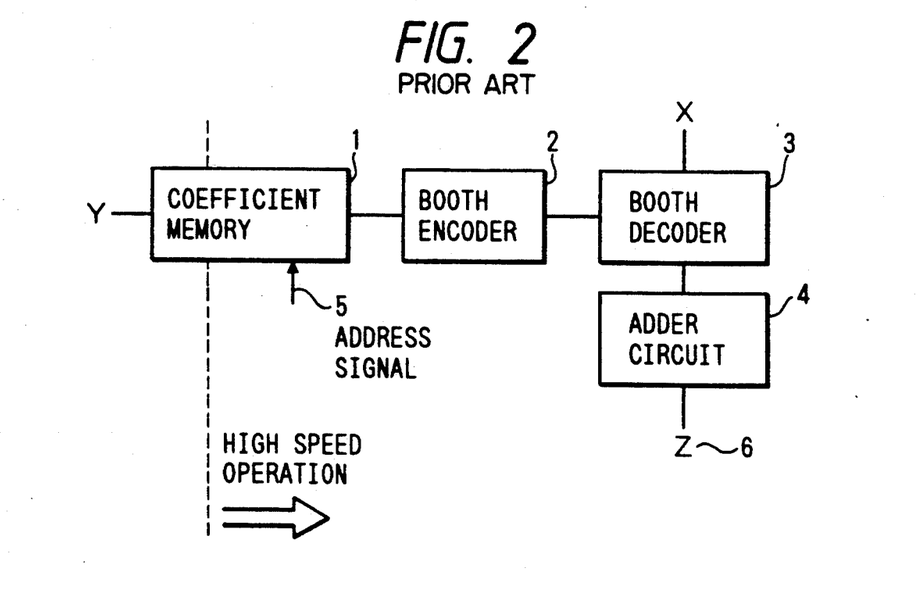
FIG. 2 is a block diagram showing an example of a conventional multiplier circuit structure.

As described in Japanese Patent Application Laid Open No. 63-1258, a multiplication circuit which reads a value from a memory device which stores a coefficient and performs multiplication between the value and another input value heretofore has had an independent multiplier and an independent coefficient memory device. A circuit structured by adopting a Booth algorithm to this multiplier is shown in FIG. 2. Generally, a 2's complement, which is often used in digital operation, is used in a parallel multiplier. Considering an 8 bit×8 bit multiplication, for instance, the two 8-bit numbers that are expressed as 2's complements (X and Y) can be expressed as Equations (1) and (2).

$$X = -2^7 x_7 + 2^6 x_6 + 2^5 x_5 + \ldots + 2^0 x_0 \quad (1)$$

$$Y = -2^7 y_7 + 2^6 y_6 + 2^5 y_5 + \ldots + 2^0 y_0 \quad (2)$$

In multiplication between 8 bits in the past, 8 additions were performed as shown in (3).

$$X \times Y = X \times (-2^7 y_7) + X \times (2^6 y_6) + \ldots + X \times (2^0 y_0) \quad (3)$$

Meanwhile, a multiplier Y is expressed as follows in a Booth algorithm.

$$Y = 2^6(-2y_7 + y_6 + y_5) + 2^4(-2y_5 + y_4 + y_3) + 2^2(-2y_3 + y_2 + y_1) + 2^0(-2y_1 y_0) \quad (4)$$

Performing a multiplication by using Equation (4) as shown in the following equation reduces the addition from 8 times to 4 times.

$$X \times Y = X \times 2^6( ) + X \times 2^4( ) + X \times 2^2( ) + X \times 2^0( ) \quad (5)$$

Figures inside the parentheses in Equation (5) are calculated from 3 bits of $y_{i+1}$, $y_i$ and $y_{i-1}$ and create Booth codes that are 0, ±1 or ±2. These Booth codes are used to obtain and sum up four partial products. Since calculation of a partial product only requires shift or inversion, it will not bring about an increase in the scale of a circuit in particular. Compared to an ordinary parallel multiplier which does not use this algorithm, the device using this algorithm seeks to improve the speed of the multiplier by reducing the number of adders in an array from 8 steps to 4 steps by obtaining a partial product for every 2 digits and summing them up.

A coefficient memory 1 where the coefficient shown in FIG. 2 is stored outputs the content of an address that has been designated by an address signal 5 to a Booth encoder 2 of a multiplier. A Booth encoder is a circuit which generates Booth codes 0, ±1 or ±2 from a binary number which is expressed as a 2's complement in the foregoing explanation of the Booth algorithm. Therefore, the content of a coefficient memory 1 is converted to a Booth code with a Booth encoder 2 and input to a Booth decoder 3. A Booth decoder refers to a circuit which performs multiplication between the Booth code generated from a Booth encoder and an input X and generates a partial product. Accordingly, an output of a multiplier refers to plural partial products which have been output from a Booth decoder that are added up by an adding circuit 4 which is comprised of a half adder and a full adder.

Figure 3:
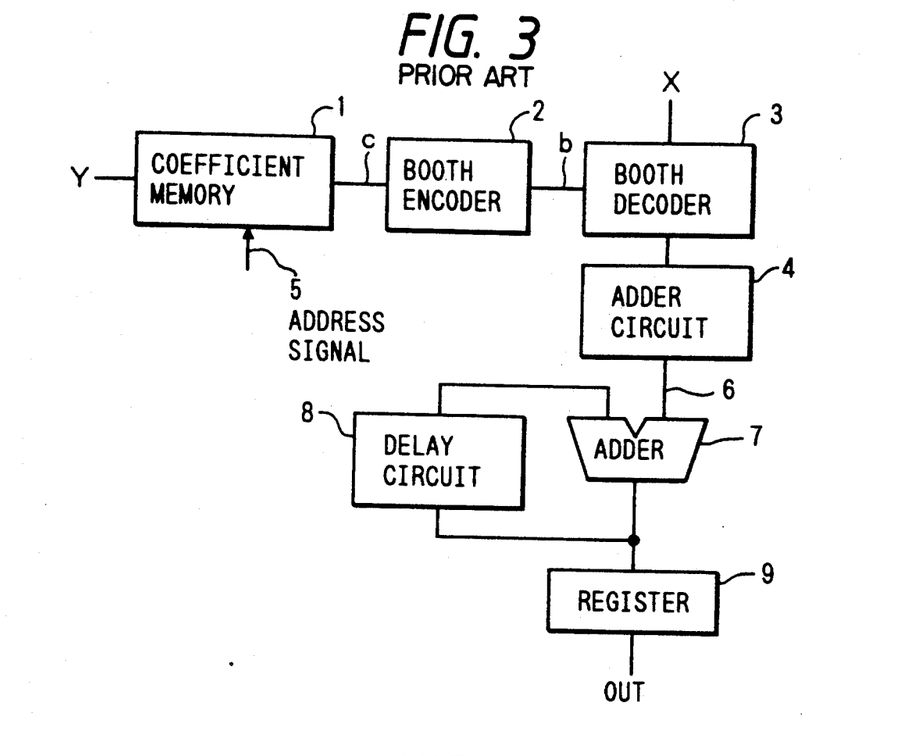
FIG. 3 is a block diagram showing an example in which a digital filter has been constructed according to a conventional circuit.

Such a combination of a multiplier and a coefficient memory device is used for an A/D converted digital signal or a signal which corresponds to it, and is used frequently for a digital filter which basically performs an operation with the combination of an adder and a delay element with a sampling period of T to obtain a given output. It has a broad range of application and is used particularly in filters for time sequential signals such as sound and control. For instance, considering a logic circuit which realizes a transfer function such as $H(Z) = C_0 + C_1 Z^{-1} + C_2 Z^{-2} + C_3 Z^{-3} + C_4 Z^{-4}$ ($Z^{-1}$ is a delay operator) through digital operation and performs filtering of signals, outputs $A_{-6}, A_{-5}, A_{-4}, \ldots A_0, A_1, A_2 \ldots$ can be expressed as follows when a signal such as $X_{-6}, X_{-5}, X_{-4}, \ldots X_0, X_1, X_2 \ldots$ is input to this circuit as shown in FIG. 3.

$$A_0 = C_0 X_0 + C_1 X_{-1} + C_2 X_{-2} + C_3 X_{-3} + C_4 X_{-4}$$

$$A_1 = C_0 X_1 + C_1 X_0 + C_2 X_{-1} + C_3 X_{-2} + C_4 X_{-3}$$

$$A_2 = C_0 X_2 + C_1 X_1 + C_2 X_0 + C_3 X_{-1} + C_4 X_{-2}$$

$$A_3 = C_0 X_0 + C_1 X_2 + C_2 X_1 + C_3 X_0 + C_4 X_{-1}$$

$$A_4 = C_0 X_4 + C_1 X_0 + C_2 X_2 + C_3 X_1 + C_4 X_0 \quad (6)$$

Figure 4:
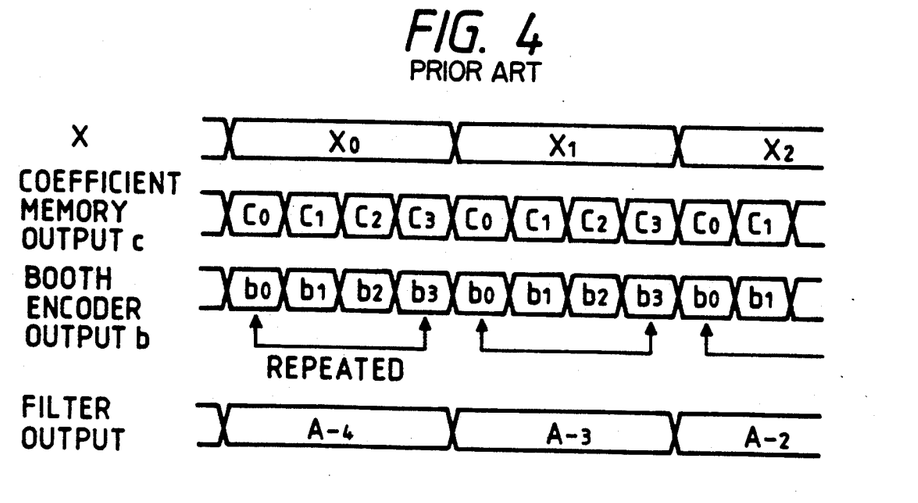
FIG. 4 is an operation timing chart of a circuit in FIG. 3.

The prior art in FIG. 2 performs this operation by using an operation circuit which is capable of performing an operation in fractions an input cycle time. In other words, when $X_0$ is input, it successively performs five multiplications $C_0 X_0, C_1 X_0, C_2 X_0, C_3 X_0, C_4 X_0$ with one multiplier. When $X_1$ is input next, five multiplications of $C_0 X_1, C_1 X_1, C_2 X_1, C_3 X_1, C_4 X_1$ are successively performed. Thus, it is necessary to perform multiplications of $C_0 X, C_1 X, C_2 X, C_3 X, C_4 X$ successively and repeatedly with multipliers of the prior art. The filter output $A_0, A_1, \ldots$ is obtained by summing the products which were obtained in the above manner as shown in Equation (6) by using the adder 7 and delay circuit 8 shown in FIG. 3. In FIG. 3, coefficients $C_0, C_1, C_2$ and $C_3$ are output repeatedly from coefficient memory 1 when $X_0, X_1, X_2, \ldots$ are input as an X input to a Booth decoder 3 and converted into Booth codes $B_0, B_1, b_2$ and $b_3$ by a Booth encoder 2. Here, as shown in the timing chart in FIG. 4, the input $X_0$ is multiplied by the coefficients $C_0, C_1, C_2$ and $C_3$, with the same operation performed for $X_1$ and $X_2$.

When the above prior art is used, Booth codes corresponding to coefficients $C_0, C_1, C_2$ and $C_3$ will appear repeatedly at the output terminal of a Booth encoder 2. A Booth encoder 2 will be repeating the operation of converting coefficients $C_0, C_1, C_2$ and $C_3$ into Booth codes. However, rewriting of a coefficient is normally nil or extremely rare after the system algorithm is determined. Accordingly, conversion the coefficient to a Booth code by Booth encoder 2 is extremely inefficient as the same operation is merely repeated until the coefficient is changed.

In addition, few examinations concerning the time of processing required for encoding of a coefficient have been conducted up to now. For this reason, a simulation was performed on a circuit which has a structure similar to a multiplier using a conventional 8 bit × 8 bit second-order Booth algorithm, revealing that the time of processing required for encoding accounts for approximately 15% of the time required for an entire multiplication of the multiplier. Moreover, use of a Booth algorithm of a higher order will be accompanied by a longer processing time for encoding. Therefore, it was revealed that, in a multiplier using a higher order Booth algorithm, the percentage of processing time required for encoding in the entire multiplication increases further. Furthermore, when a digital filter is structured by using the foregoing multiplication circuit, there was a problem of limitations in a number of filter taps and operation speed due to insufficient operation speed of the multiplication circuit.

SUMMARY OF THE INVENTION

The object of the present invention is to improve the inefficient operation of a Booth encoder and to increase the speed of a multiplier.

For this reason, the present invention features storage of the foregoing coefficients by converting them in advance into codes that have been put through conversions necessary for the foregoing operation and performing operation processing of the stored content between the signal of the foregoing code that has been read out and the foregoing input signal in a semiconductor operation device and a digital filter which reads out a pertinent coefficient from a memory device storing plural coefficients and performs operation by repeatedly using the said coefficient.

Figure 1:
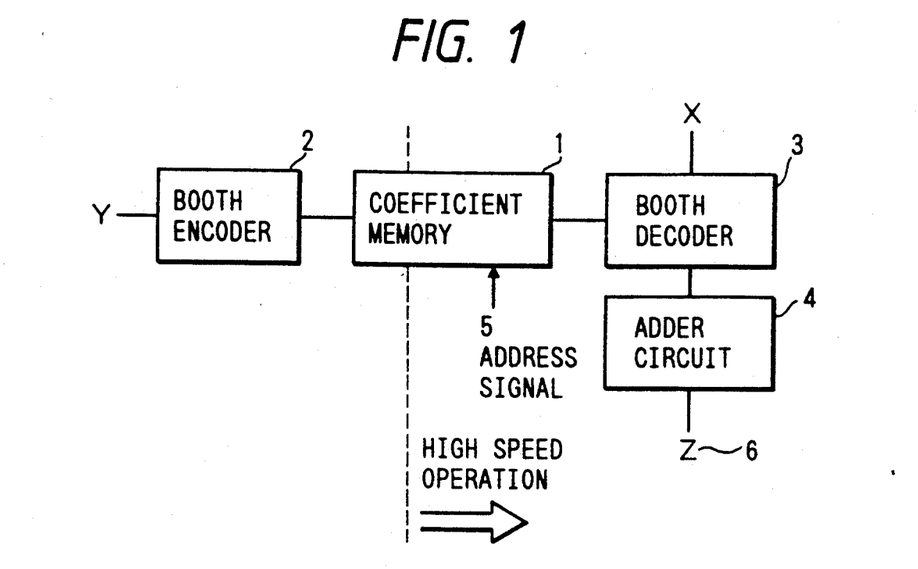
FIG. 1 is a block diagram showing a case of application to a multiplier according to a first embodiment of the present invention.
Figure 5:
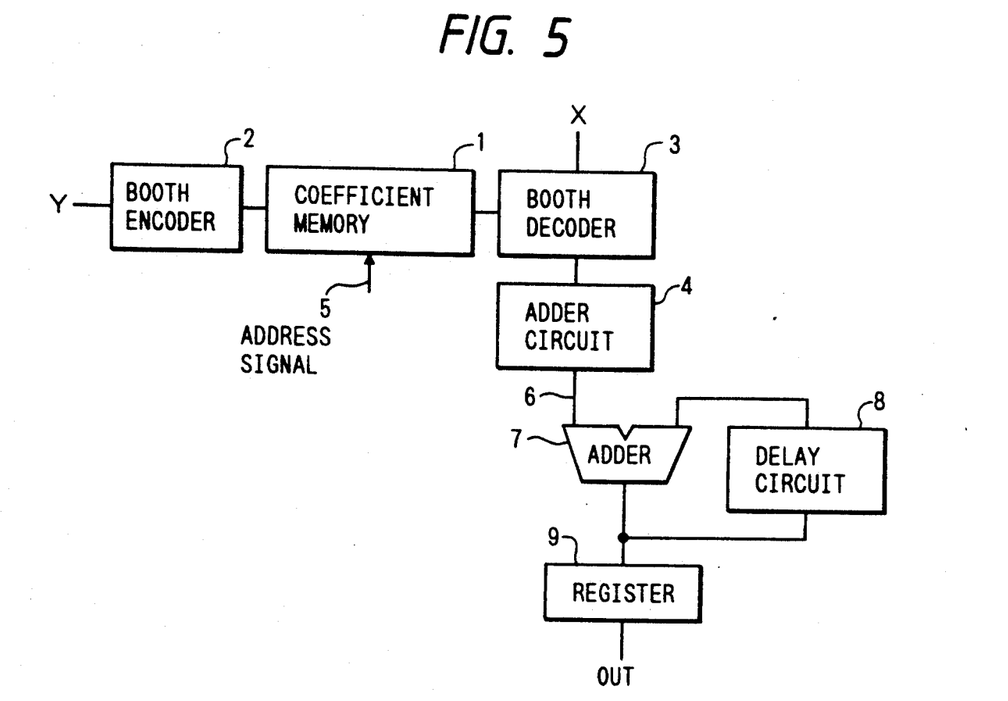
FIG. 5 is a block diagram showing a second embodiment of the present invention.

To be more concrete, as shown in FIG. 1 and FIG. 5, for instance, the present invention features a means for storing a coefficient by converting it into a code in advance for operation and a means of performing operation processing between an output signal from the storage device and the input signal.

Here, a means of storing a coefficient by converting it into a code in advance for operation shall be that which stores data created by Booth encoding plural coefficients, while the foregoing means of performing operation processing shall be equipped with a Booth decoder that outputs a partial product by executing a multiplication between an output signal of the coefficient memory and an input signal of the Booth decoder and a means of addition for obtaining plural sum totals of the Booth decoder.

In this case, performing storage of the foregoing Booth encoded data into a coefficient memory by inputting plural coefficients in bit serial form, converting them into parallel signals corresponding to the number of bits for an encoding unit through a serial/parallel conversion circuit, inputting them into a Booth encoder for the number of bits for an encoding unit and successively writing the output of the Booth encoder to the coefficient memory will be desirable as it will realize a smaller scale of the circuit.

Otherwise, structuring the foregoing means as a digital filter equipped with a means of storing a coefficient for operation by converting it into a code for operation in advance and a means of performing operation processing between an output signal of the means of storage and another input signal, as shown in FIG. 5, will be effective as the foregoing object will be achieved at a digital filter as well.

Or otherwise, equipping the foregoing means with a bi-level digitizer for an analog input and an encoding circuit comprised of a memory which converts output from the bi-level digitizer into a Booth code as a means of storing a coefficient by converting it into a code for operation in advance is desirable in terms of speeding up a device and reducing the scale of a circuit in a semiconductor device which performs operation on an analog input.

In other words, the foregoing means of the present invention is that which puts a Booth encoder, for instance, for encoding of an operation outside a circuit system where an operation is repeated and stores the content which has been converted into a Booth code to a coefficient memory, for instance, as a means of memory. That is, the present invention directly connects a coefficient memory for storing a Booth code to a Booth decoder of a multiplier, for instance, for operation. The result of multiplication can be obtained by summing up the outputs of a Booth decoder with an adder circuit comprised of half adders and full adders.

According to the foregoing structure, the present invention has the following functions and operations.

In the present invention, a coefficient value shall be converted in advance into a Booth code, for instance, and stored in a coefficient memory, using a signal which has been converted into a code for operation directly for operation. In other words, a Booth encoder for converting a coefficient value into a code for operation shall be placed outside a high-speed circuit. According to this structure, such operation of encoding by Booth encoder is performed only once when a coefficient is rewritten and is not repeated. This is because an encoded Booth code is used directly for operation after a coefficient has been determined. For this reason, speed will not be limited by the time required for encoding by a Booth encoder. An operation speed of the present invention, for instance, is prescribed by the time required from determination of address signal for coefficient memory until multiplication output is obtained. In the present invention, reduction of multiplication time equivalent to the time required for Booth encoding will be possible.

When the present invention is used for a digital filter, the operation speed of a multiplier increases due to lack of repetitive operation of a Booth encoder circuit from the present invention, which, in turn, increases the operation speed of the entire digital filter. Accordingly, a digital filter with more taps within a certain period of time can be constructed using multiple multipliers. In addition to a digital filter, the technology of the present invention can be applied to a product-sum operation such as a matrix operation. Moreover, the present invention can be applied to cases where circuits are used in parallel in addition to cases where they are used in a multiple manner.

Since a Booth encoder is not related to the normal circuit operation speed in the structure of the present invention, more emphasis can rather be placed on reduction of circuit scale with regard to this section. Using the structure of the present invention in which an input of plural bit-serial coefficients are encoded by converting them into parallel signals that correspond to the number of bits for an encoding unit and successively writing them into coefficient memory will not only make it possible to change a coefficient input to a single signal line input but also will give rise to a merit of enabling reduction of circuit scale by requiring only one Booth encoder, for instance.

As mentioned above, digitizing an input signal to a bi-level signal and converting the digitized signal into a Booth code for operation on an analog input will make it possible to omit a Booth encoder that was previously required for conversion into a Booth code and bring about speed-up of the device and reduction of circuit scale.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

The first embodiment of the present invention is shown in FIG. 1. FIG. 1 is a multiplier circuit using a circuit structure of the present invention. In FIG. 1, a Booth encoder 2 which converts a coefficient Y to a Booth code is put outside a circuit system which performs repetitive operation and the content of the Booth code conversion is stored in coefficient memory 1. In other words, a coefficient memory 1 which stores a Booth code is connected directly to a Booth decoder 3 of a multiplier. As a result, operation time of Booth encoder 2 will not affect multiplication time because operation is always performed by reading out a Booth code from coefficient memory 1 in an ordinary multiplication. Moreover, inefficient operation of a Booth encoder is improved. At an output from Booth decoder 3, a result of multiplication is obtained by finding a sum through an adder circuit comprised of half adders and full adders.

The second embodiment of the present invention is shown in FIG. 5. FIG. 5 is an example of a digital filter that has been constructed with a multiplier of the present invention. Coefficient Y is converted into a Booth code in advance by a Booth encoder 2 and is stored in coefficient memory 1. An output signal line of coefficient memory 1 is connected with a Booth decoder 3. Product $Z = X \times Y$ is obtained by adding up plural outputs from a Booth decoder 3 through an adder circuit 4. Moreover, a multiplier output 6 is input to an adder 7. An output from an adder 7 is delayed by one sampling period through a delay circuit 8 and is input to another input terminal of an adder 7. A result of performing a prescribed number of multiplications and additions with changing a coefficient in a prescribed order is output through a register 9. At this time, an operation speed of a multiplier will be a time from when a change occurs in an address signal of a coefficient memory 1 until a multiplication output 6 is output. A speed improvement equivalent to an operation speed of Booth encoder 2 can be obtained by arranging a Booth encoder 2 on an input side of a coefficient memory 1.

Figure 6:
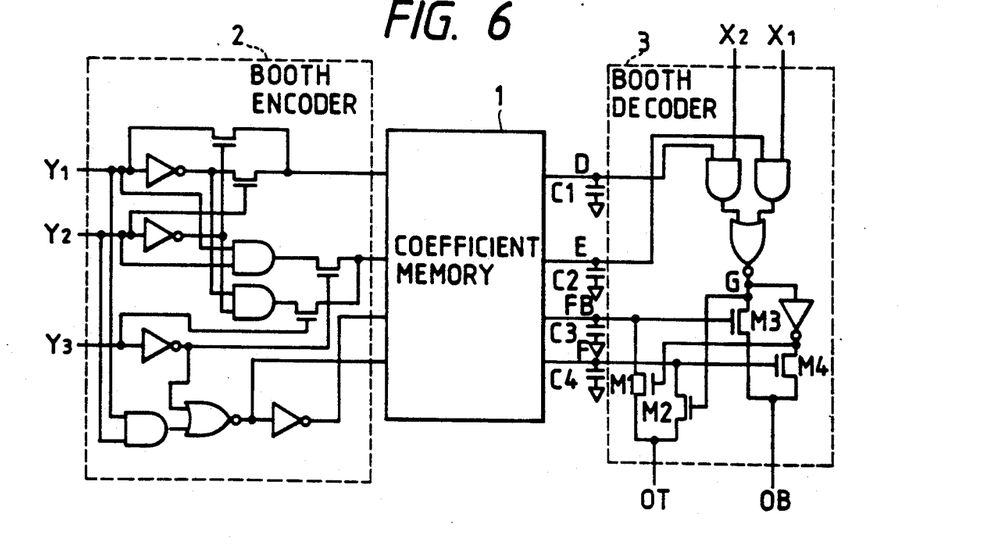
FIG. 6 is a circuit diagram when a Booth decoder shown in FIG. 5 is constructed by using a CPL circuit.
Figure 7:
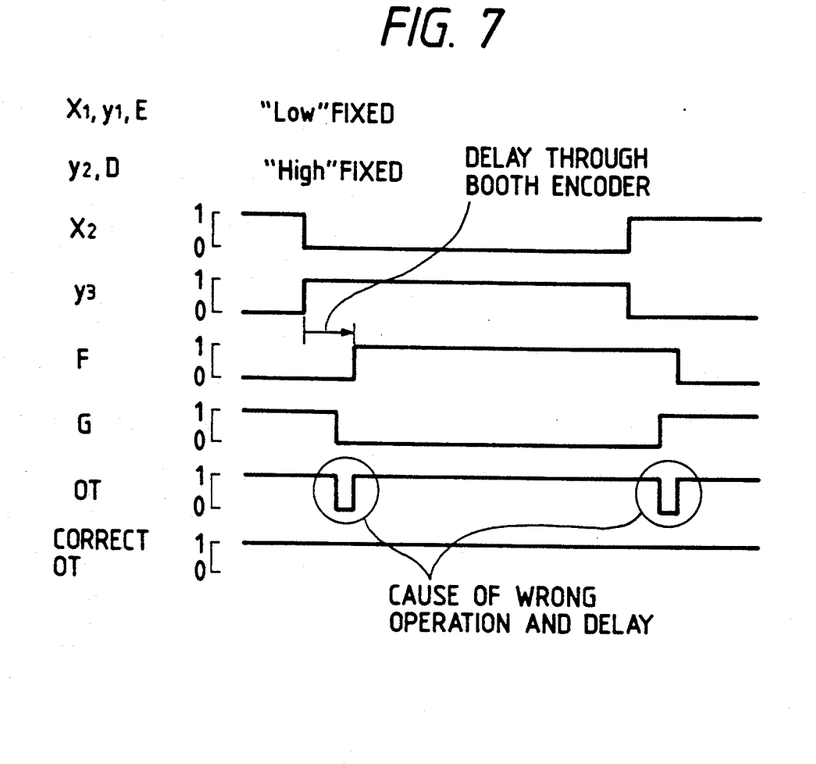
FIG. 7 is an operation timing chart in which a Booth encoder and a Booth decoder in FIG. 6 are used in the conventional circuit in FIG. 3.
Figures 13, 14:
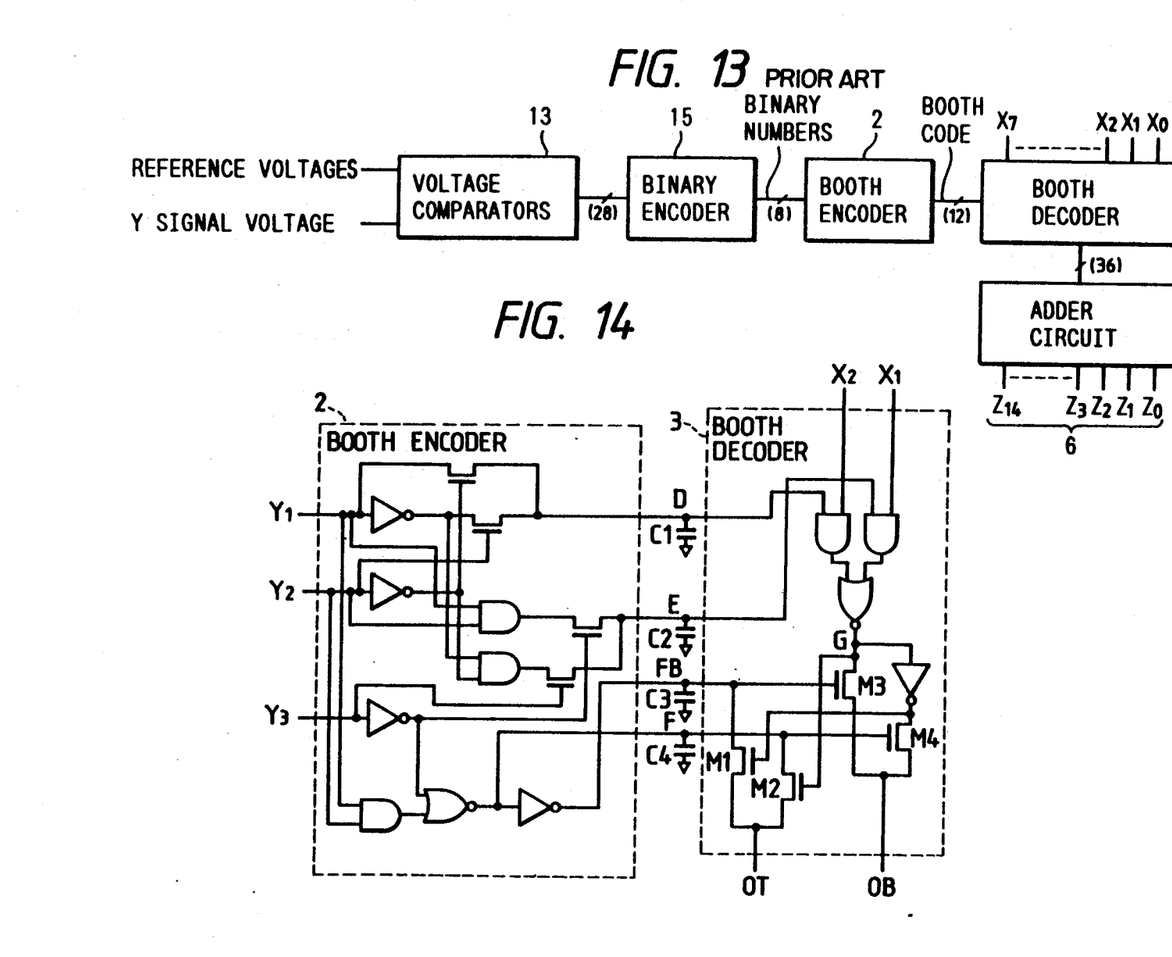
FIG. 13 is an example of a conventional circuit in contrast to a circuit shown in FIG. 12.
FIG. 14 is a circuit diagram in which a Booth encoder and a Booth decoder in FIG. 6 are used in the conventional circuit in FIG. 3.

FIG. 6 is a circuit diagram showing a 3-bit Booth encoder 2 and a 1-bit Booth decoder 3 in the circuit structure of FIG. 5. A case in which a complementary pass transistor logic (hereinafter abbreviated as CPL) is used in a Booth decoder 3 to improve a multiplier speed will be described. A CPL circuit comprises four transistors (M1–M4) as shown in FIG. 6. This circuit is a logic circuit which is controlled by complementary input signals and obtains complementary outputs. Accordingly, logic circuits such as AND, NAND, OR and NOR can be constructed easily by combining pass transistors. It features smaller circuit scale and higher operation speed when compared to ordinary logic circuits and is used for a logic circuit structure of a high-speed operation device, etc., by taking advantage of these features. For the reasons stated above, a use of a CPL circuit in a Booth decoder has an effect of being able to obtain high-speed operation from a simple circuit. However, the problems described in the following arise when a CPL circuit is used in a Booth decoder 3 without changing the conventional circuit shown in FIG. 3. FIG. 14 is a circuit diagram of a case in which a Booth encoder and a Booth decoder in FIG. 6 are used the conventional circuit in FIG. 3. In an 8 bit×8 bit multiplier, nine 1-bit Booth decoders 3 are connected in parallel a 3-bit Booth encoder 2. For this reason, load capacities $C_1$, $C_2$, $C_3$, $C_4$, which are equivalent to the remaining 8 Booth decoders are shown connected to each output terminal of a Booth encoder 2 in FIG. 14. Let us consider, for instance, a case in which $(x_1, x_2)$ changes from (0, 1) to (0, 0) and $(y_1, y_2, y_3)$ from (0, 1, 0) to (0, 1, 1) at the same time. The status of circuit operation at this time is shown in a timing chart in FIG. 7. When a node G signal inside a Booth decoder 3 and an output F of a Booth encoder 2 are compared, a change in F is slower than that of G. This is because F, an output from a Booth encoder 2, is connected to more Booth decoder circuits and therefore has greater load capacity, and because F has extra gate stages to pass through compared to G as signal passes through a Booth encoder 2 circuit. Here, OT should normally remain at "High." As shown above, however, a waveform shown in OT appears due to difference in signal timing of G and F. As a result, a circuit at the latter stage first changes to a status corresponding to "Low" and then returns to a normal status corresponding to "High," and will be delayed accordingly. In addition, erroneous operation may occur. Here, the foregoing problem can be solved by using the present invention to the foregoing circuit with a CPL circuit to create a circuit structure shown in FIG. 5, as it will make it possible to match the timing of inputs to a Booth decoder 3.

Figure 8:
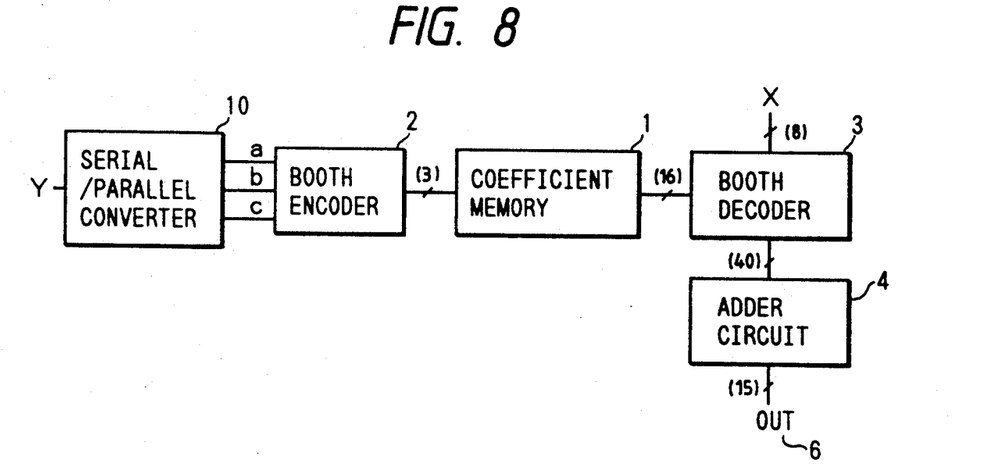
FIG. 8 is a block diagram showing a third embodiment of the present invention.

The third embodiment of the present invention is shown in FIG. 8. In the past, a coefficient Y which is input to a multiplier had been input to a Booth encoder 2 by using 8 signal lines if it was an 8 bit×8 bit multiplier. In this embodiment, an 8-bit coefficient is input serially through a single signal line and converted to groups of 3 bits, which corresponds to the number of bits for an encoding unit in a 2 clock processing, and transferred to a Booth encoder 2 by using a serial/parallel converter 10. When a second order Booth algorithm is used, a Booth encoder will encode every 3 bits. When $y_0, y_1, y_2, y_3, y_4, y_5, y_6, y_7$ are input, they are converted into 4 groups of 3-bits: $(0, y_0, y_1), (y_1, y_2, y_3), (y_3, y_4, y_5)$ and $(y_5, y_6, y_7)$. A coefficient is stored in a coefficient memory after it is converted every 3 bits into a Booth code. This operation is repeated 4 times, and all 8-bit coefficients are converted into Booth codes and stored in coefficient memory 1.

Figure 9:
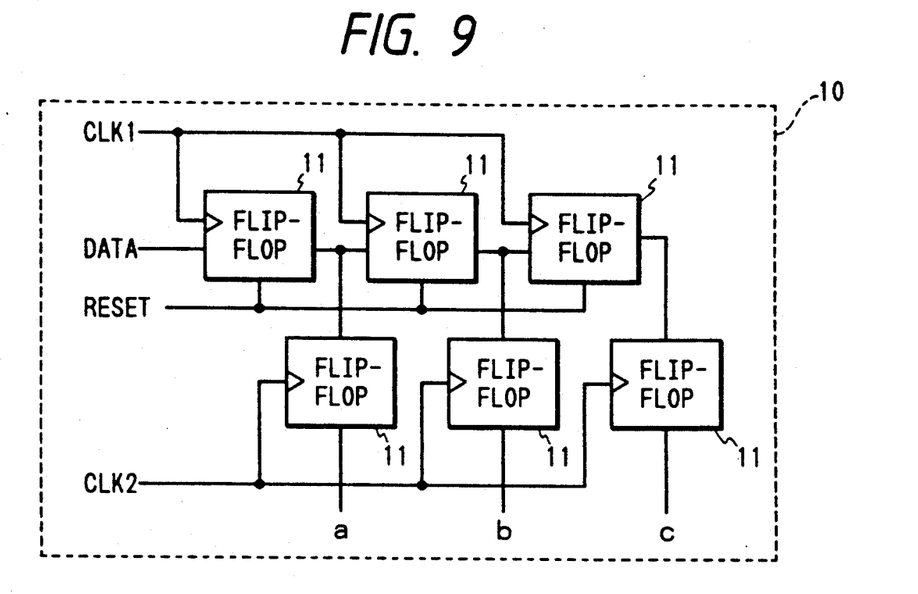
FIG. 9 is a circuit diagram of a serial/parallel conversion circuit.
Figure 10:
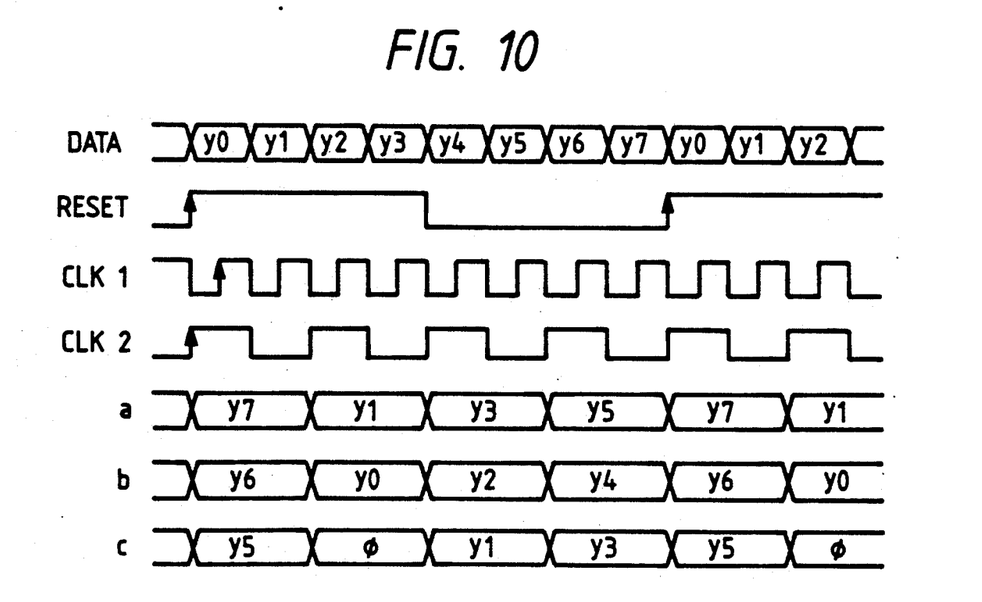
FIG. 10 is an operation timing chart of a circuit shown in FIG. 9.

FIG. 9 shows a simple circuit structure of a serial/parallel converter 10 in the third embodiment. Six D-type flip-flops 11 are used as a latch circuit for converting a 3-bit serial signal into a 3-bit parallel signal. A timing chart of a serial/parallel converter 10 is shown in FIG. 10. Being a serial/parallel converter for a Booth encoder, it is structured in such a way that a serial input such as $y_0, y_1, y_2, y_3, y_4, y_5, y_6, y_7$ will be output as $(0, y_0, y_1), (y_1, y_2, y_3), (y_3, y_4, y_5)$ and and $(y_5, y_6, y_7)$.

Figure 11:
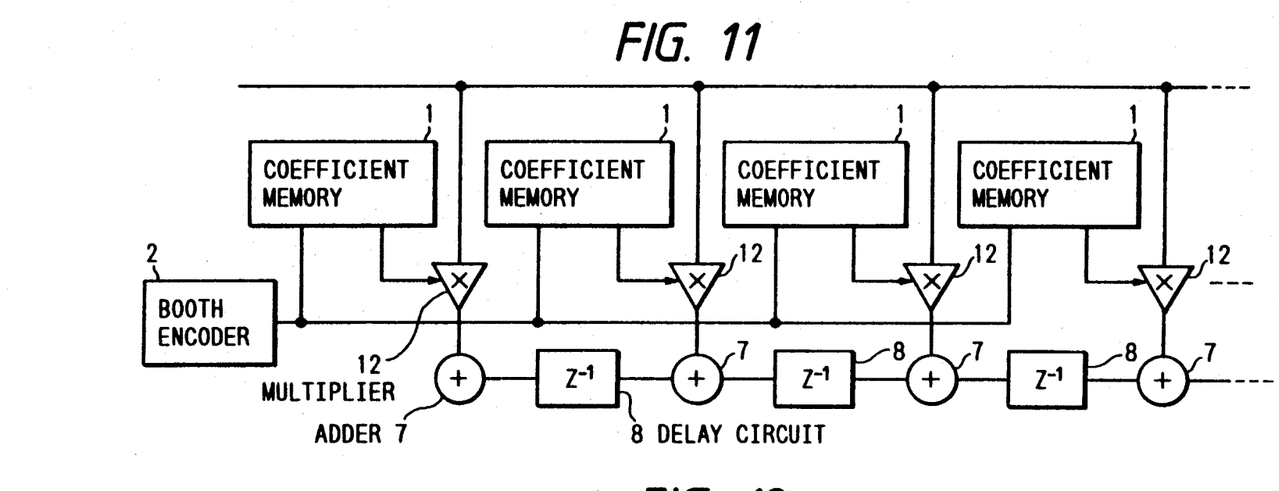
FIG. 11 is a block diagram showing a fourth embodiment of the present invention.

In the case where this embodiment is used, it becomes possible to reduce the number of LSI pins because a coefficient is input through a single signal line. In addition, a circuit scale of a Booth encoder 2 can be reduced to approximately one fourth when a second order Booth algorithm is used in an 8 bit×8 bit multiplier. The fourth embodiment of the present invention is shown in FIG. 11. FIG. 11 is an example in which a high order digital filter has been constructed by using plural coefficient memories 1, multipliers 12, adders 7, delay circuits 8, and one Booth encoder 2. In the case of a conventional circuit structure, one Booth encoder 2 was used for one multiplier 12. As a result, n Booth encoders were necessary when a digital filter was constructed by using n multipliers. In the embodiment to which the present invention has been applied, however, plural multipliers are operated by using one Booth encoder 2, thereby enabling a reduction of circuit scale since only one Booth encoder 2 is needed when constructing a high order digital filter. It is also possible to input coefficients in serial signals in this embodiment as shown in FIG. 8. A circuit reduction effect is even greater in such case.

In the embodiments a multiplier shown in FIG. 1 and FIG. 5, only the case where a second order Booth algorithm had been adopted in the multiplier were explained. However, similar execution is possible for Booth multipliers of other degrees. Moreover, although only non-symmetrical and non-recursive digital filters were explained with regard to the embodiments in FIG. 5 and FIG. 11, the same application is also possible for symmetrical and recursive digital filters.

Figure 12:
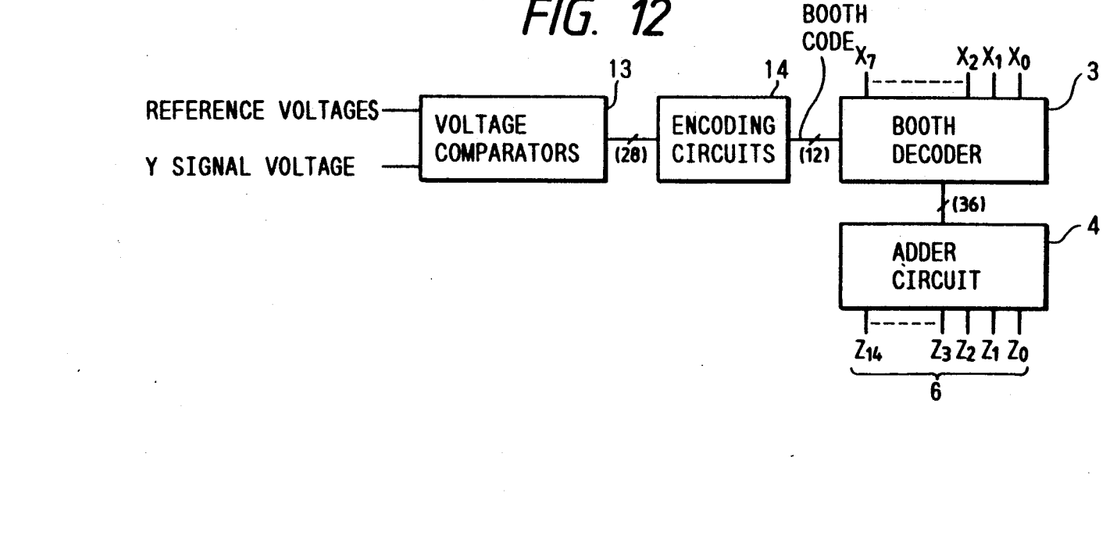
FIG. 12 is a block diagram showing a fifth embodiment of the present invention.

The fifth embodiment of the present invention is shown in FIG. 12. FIG. 12 is a device which converts an analog signal to a digital code and multiplies the converted digital code by a value expressed in 8-bit binary form. Voltage comparators 13 are circuits for comparing an input analog signal with a reference voltage and digitizing it to a bi-level signal. Encoding circuits 14 are circuits comprising a memory for converting bi-level signals that are obtained from voltage comparators 13 into Booth codes. Here, X is a multiplied number and is a binary 8 bit value expressed as 2's complement. An output from encoding circuits 14 is input to a Booth decoder 3 and output after adding a prescribed operation to an input X. A multiplication output is obtained by summing up outputs from a Booth decoder 3 with an adder circuit 4. Here, a circuit structure of a conventional circuit is shown in FIG. 13 for reference. In FIG. 13, a numerical value which has been digitized into a bi-level, signal by voltage comparators 13 is converted into a binary number by a binary encoder 15, and a converted binary number is input to a Booth encoder 2. A Booth encoder 2 converts an input binary number to a Booth code used for multiplication. A Booth code is input to a Booth decoder 3 and is multiplied by an input X. Thus, a conventional circuit has required a Booth encoder 2 for converting a binary number into a Booth code. In the embodiment shown in FIG. 12, a Booth encoder which was previously necessary can be omitted, thereby enabling reduction of circuit scale in addition to the speed-up of a multiplier. Moreover, a digital filter can be structured by connecting a multiplication circuit to a multiplier output.

While the case of 8-bit data and an 8-bit coefficient was explained in this embodiment, similar results can be obtained with other bit numbers as well.

Incidentally, although an example of a Booth code was used as a typical code in an operation, the present invention is not limited to Booth code alone. In addition, although a multiplier is described in the foregoing embodiments, similar concept can also be applied to a serial operation among others.

Since the present invention is capable of eliminating a Booth encoder which had previously been included in an operation circuit outside a repeatedly operating circuit system, it has an effect of reducing operation time by omitting wasteful operation of a Booth encoder circuit. Applying the present invention to an 8 bit×8 bit multiplier using a second order Booth algorithm will enable reduction of multiplication time by approximately 15%. Moreover, a greater effect can be attained by applying the present invention to a multiplier using a Booth algorithm of a higher order. Furthermore, reduction of operation time of a circuit and prevention of erroneous operation of a circuit will become possible when a Booth decoder circuit is constructed by using a CPL circuit.

Generally speaking, a speed of a multiplier is a major factor in determining the speed performance of a digital filter when a digital filter is constructed using a multiplier and an adder. Accordingly, a speed of an entire digital filter can be increased when a multiplier in the present invention is applied to a digital filter.

What is claimed is:

1. A semiconductor operation device for performing an operation on an input signal based on a plurality of coefficients, comprising:
   encoding means for encoding the plurality of coefficients into a plurality of operation codes required to perform the operation on the input signal prior to performing the operation on the input signal, each of the coefficients being encoded into at least two operation codes;

first storing means for storing the operation codes prior to performing the operation on the input signal, and sequentially outputting the stored operation codes while performing the operation on the input signal;

operating means for sequentially operating on the input signal with the operation codes sequentially outputted from the first storing means, thereby sequentially producing a plurality of partial operation results; and first adding means for adding together the partial operation results to produce a first output signal, the first output signal representing the input signal having the operation performed thereon based on the plurality of coefficients.

2. A semiconductor operation device according to claim 1, wherein the operation is multiplying, and wherein the operation codes are Booth codes.

3. A semiconductor operation device according to claim 1, wherein each of the coefficients is represented by a multi-bit serial digital signal supplied to the semiconductor operation device;

wherein the semiconductor operation device further comprises serial/parallel converting means for converting the multi-bit serial digital signal into a plurality of multi-bit parallel digital signals; and wherein the encoding means encodes each of the multi-bit parallel digital signals into an operation code.

4. A semiconductor operation device according to claim 1, wherein each of the coefficients is represented by an analog signal supplied to the semiconductor operation device;

wherein the semiconductor operation device further comprises comparing means for comparing the analog signal with a plurality of reference voltages and converting the analog signal into a plurality of bi-level signals based on results of comparing the analog signal with the reference voltages; and wherein the encoding means encodes the bi-level signals into at least two operation codes.

5. A semiconductor operation device according to claim 4, wherein the operation is multiplying, and wherein the operation codes are Booth codes.

6. A semiconductor operation device according to claim 1, wherein the operation is multiplication, and wherein the operating means includes a multiplier implemented with a complementary pass transistor logic circuit.

7. A semiconductor operation device according to claim 1, further comprising:

second adding means for adding the first output signal from the first adding means to a delayed signal to produce a second output signal;

delaying means for delaying the second output signal from the second adding means by a predetermined period to produce a delayed second output signal and supplying the delayed second output signal to the second adding means as the delayed signal; and second storing means for storing the second output signal from the second adding means and outputting the stored second output signal as a third output signal.

8. A semiconductor operation device according to claim 7, wherein each of the coefficients is represented by an analog signal supplied to the semiconductor operation device;

wherein the semiconductor operation device further comprises comparing means for comparing the analog signal with a plurality of reference voltages and converting the analog signal into a plurality of bi-level signals based on results of comparing the analog signal with the reference voltages; and wherein the encoding means encodes the bi-level signals into at least two operation codes.

9. A semiconductor operation device according to claim 8, wherein the operation is multiplying, and wherein the operation codes are Booth codes.

10. A semiconductor operation device according to claim 7, wherein the operation is multiplication, and wherein the operating means includes a multiplier implemented with a complementary pass transistor logic circuit.

* * * * *